(12) United States Patent
Epstein

(10) Patent No.: US 6,748,531 B1
(45) Date of Patent: Jun. 8, 2004

(54) METHOD AND APPARATUS FOR CONFIRMING AND REVOKING TRUST IN A MULTI-LEVEL CONTENT DISTRIBUTION SYSTEM

(75) Inventor: Michael A. Epstein, Spring Valley, NY (US)

(73) Assignee: Koninklijke Philips Electronics N.V, Eindhoven (NL)

( * ) Notice: Subject to any disclaimer, the term of this patent is extended or adjusted under 35 U.S.C. 154(b) by 0 days.

(21) Appl. No.: 09/537,081

(22) Filed: Mar. 28, 2000

(51) Int. Cl.⁷ .................................................. G06F 11/00

(52) U.S. Cl. ........................ 713/158; 713/158; 713/159; 713/200

(58) Field of Search ................................ 713/158, 157, 713/200

(56) References Cited

U.S. PATENT DOCUMENTS

| | | | |
|---|---|---|---|
| 5,687,235 A | 11/1997 | Perlman et al. ............... 380/25 |
| 5,949,877 A | 9/1999 | Traw et al. ..................... 380/4 |
| 5,960,083 A * | 9/1999 | Micali .......................... 713/175 |
| 6,009,401 A | 12/1999 | Horstmann .................... 705/1 |
| 6,009,525 A | 12/1999 | Horstmann ................. 713/200 |
| 6,301,659 B1 * | 10/2001 | Micali .......................... 713/158 |
| 6,367,013 B1 * | 4/2002 | Bisbee et al. ................. 713/178 |
| 6,397,329 B1 * | 5/2002 | Aiello et al. ................. 713/155 |
| 6,615,347 B1 * | 9/2003 | de Silva et al. ............. 713/156 |

OTHER PUBLICATIONS

Li Gong, "A Secure Identity–Based Capability", Proceddings 1989 IEEE Symposium on Security and Privacyu CAT No. 89CH2703 7, pp. 56–63, Published Washington DC USA 1989 VII 343 pp.

Paul C. Kocher, "On Certificate Revocation and Validation", Financial Sryptography Second International Conference FC 98 Proceedings, pp. 172–177, Published Berlin, Germany, 1998 VIII 310 pp.

Spinellis et al., "Trusted Third party Services for Deploying Secure Telemedical Applications over the WWW", Computers Security, vol 18, No. 7, pp. 627–639, 1999.

* cited by examiner

Primary Examiner—Norman M. Wright
(74) Attorney, Agent, or Firm—Gregory L. Thorne

(57) ABSTRACT

A hierarchical arrangement of revocation lists, corresponding to a hierarchy of content processing and rendering devices is used to optimize the processing and storage of revocation lists. At each level of the hierarchy, an access device provides its certification to an access device at a higher level in the device hierarchy. The higher level device compares the lower level device's certification to a revocation list corresponding to devices at the lower level. If the certificate has not been revoked, the higher level device provides a lower level revocation list to the lower level access device. The lower level access device uses this lower level revocation list to verify the status of devices to which it communicates content material. Because each list is limited to devices at each level of a conventional hierarchy of consumer devices, the lists provide an optimization at each device, by providing revocations only for devices that are expected to be used at the particular hierarchy level.

15 Claims, 2 Drawing Sheets

METHOD AND APPARATUS FOR CONFIRMING AND REVOKING TRUST IN A MULTI-LEVEL CONTENT DISTRIBUTION SYSTEM

BACKGROUND OF THE INVENTION

1. Field of the Invention

This invention relates to the field of encryption, and in particular to the control of copy protected content material.

2. Description of Related Art

Techniques continue to be advanced to prevent the illicit acquisition of copy protected material, such as recorded entertainment material. A number of these techniques involve the use of devices that are manufactured to comply with established copy protection standards. Each compliant device enforces rules and procedures designed to minimize the likelihood that the device will be used to impermissibly copy protected material. For example, a cost-effective method of copy protection is discussed in detail by Jean-Paul Linnartz et al., in Philips Electronics Response to Call for Proposals Issued by the Data Hiding Subgroup Copy Protection Technical Working Group, July 1997 ("Linnartz"), which is incorporated herein by reference. The Linnartz scheme operates by attaching a "ticket" to the recorded material; the ticket comprises a verifiable "count" that is decremented at each stage of the playback and recording process, and is cryptologically difficult to increment. A cryptologically difficult process is one that can be expected to require an inordinate amount of time to complete, relative to the potential gain that may be realized by devoting this amount of time. A compliant device enforces this ticketing scheme by refusing to play or record material with an expired or missing ticket, by decrementing the ticket each time the material is played back or recorded, and so on. Other protection schemes are also common in the art that rely on compliant devices to enforce the protection.

To prevent the copying of protected material via an interception of the material, each compliant device communicates the content material to another compliant device in an encrypted form. The material is encrypted at the transmitting device using an encryption key, and decrypted at the receiving device using a decryption key. To minimize the adverse effects of a breach of security that reveals the decryption key, a different encryption scheme, requiring a different decryption key, is used for each target receiving device. In this manner, a discovery of a decryption key does not affect the security of encrypted material that is communicated to other receiving devices.

To effect a unique encryption scheme for each receiving device, a key exchange or key distribution is effected between devices. A variety of techniques are commonly available for exchanging or distributing keys. In one such transaction, the target receiving device provides a public key corresponding to an asymmetric public-private key pair that is associated with the receiving device. The source transmitting device encrypts the content material using this public key and then transmits the encrypted content material to the target receiving device. Because a knowledge of the public (encryption) key of a public-private key pair does not aid in a search for the corresponding private (decryption) key, this communication of public key and encrypted material is cryptographically secure. Other techniques are also used, each typically requiring the communication of a parameter that is related to a secret parameter of the receiving device such that the communicated parameter allows a transmitter to encrypt a message that can only be decrypted by a device having knowledge of the secret parameter. For ease of reference, the term public parameter is used herein to include the communicated parameter, and the term private parameter is used herein to include the parameter of each of these key exchange scenarios that is kept secret.

To assure that copy protected material is provided only to compliant devices, each compliant source device requires a verification that the receiving device is a legitimate compliant device. This verification is typically achieved via a certification process. A trusted authority (TA), or certifying authority (CA) provides a certificate that verifies that the public parameter is legitimate. Typically, this certificate has a digital signature associating the public key with a specific device or entity. The trusted authority creates this certificate using another private key that is known only to the trusted authority. The trusted authority publishes a public key corresponding to its private key, and the source device uses the trusted authority's public key to decrypt the certificate to determine whether the communicated public key is valid. In this manner, a counterfeiter cannot obtain protected material by merely providing its own public key to a source device, because the counterfeiter would also need to provide a certificate associated with this public key that is encrypted using the trusted authority's private key. A counterfeiter may, however, be able to clone a compliant device, and thereafter gain unauthorized access to protected content material.

To prevent the proliferation of cloned devices, or to minimize the profits that may be gained by a cloned device or other devices that are used for the unauthorized distribution of copy protected materials, a "revocation list" is published by the trusted authority. The revocation list contains a list of all certified public keys that have been found to have been used for illicit purposes. The providers of content material, such as CD or DVD manufacturers, have access to a "master list" of these revoked keys. The manufacturers communicate the list of revoked keys, or a sub-list of recently revoked keys, to consumer devices that exchange copy protected material by encoding the list, or sub-list, as "out of band" data that is recorded on the CD or DVD or other medium. The out of band data, for example, also includes the table of contents of the particular CD or DVD, a unique identifier of the CD or DVD, and so on. Each time one device communicates to another device, updates to the revocation list can be communicated. In this somewhat amorphous peer-to-peer communication network, it is expected that the identification of cloned devices or other unauthorized devices will be disseminated broadly enough so that at least a substantial portion of the unauthorized devices will be disallowed service by compliant devices. As the odds increase that an unauthorized device may be detected, the perceived worth of such unauthorized devices is diminished, and the gain that can be realized by providing such devices is reduced, thereby discouraging the continued distribution of these unauthorized devices.

With increased availability of low-cost, high-density memory devices, such as giga-byte sized hard disk devices, large amounts of content material can be stored on low-cost portable devices. Such devices may be configured as stand-alone playback devices, or as transfer devices that are used to effect a transfer of material between less portable systems, such as between a home audio library and an automotive stereo system. To be successful, such systems must facilitate the transfer of information between compliant devices with minimal burden on the user. This ease of transfer, however, facilitates the illicit copying of copy protected material. In general, these portable devices are somewhat remote from the aforementioned peer-to-peer communication network that uses out of band data to communicate revocation lists.

The proliferation of devices that may receive copy protected content material increases the number of authorization certificates, and correspondingly, the potential list of revoked certificates. U.S. Pat. No. 5,687,235 "CERTIFICATE REVOCATION PERFORMANCE OPTIMIZATION", issued Nov. 11, 1997 to Perlman et al, discloses the use of a "revocation service" for improving the efficiency of revocation list distribution. In the '235 patent, a device submits a request for a subset of the current revocation list from the revocation service provider, via a network connection. The request includes parameters such as a maximum size for this subset, a date from which to select revoked certificates for inclusion in the list, expiration dates of certificates, and so on. In this manner, the requesting device can control the amount of information received at any one time, can delete entries in its local revocation list based on expiration dates, and so on. In "On Certificate Revocation and Validation" (Financial Cryptography Second International Conference, FC 98 Proceedings, pages 172–177), Paul C. Kocher discloses a tree structure for organizing revocation lists that minimizes the certifications required to validate the lists, and optimizes the determination of whether a particular certificate is included in the revocation list via a directed search. Despite these techniques and others that improve the efficiency of the distribution and use of revocation lists, it is expected that further improvements are required to efficiently and effectively provide security among a large number of devices.

BRIEF SUMMARY OF THE INVENTION

It is an object of this invention to increase the likelihood that devices that provide or use unauthorized copies of content material are detected. It is a further object of this invention to provide a copy protection system that is well suited for ease of use for portable playback and transfer devices. It is a further object of this invention to provide a copy protection system that is suitable for use with other techniques used to efficiently distribute and enforce revocation lists.

These objects and others are achieved by providing a hierarchical arrangement of revocation lists, corresponding to a hierarchy of content processing and rendering devices. At each level of the hierarchy, an access device provides its certification to an access device at a higher level in the device hierarchy. The higher level device compares the lower level device's certification to a revocation list corresponding to devices at the lower level. If the certificate has not been revoked, the higher level device provides a lower level revocation list to the lower level access device. The lower level access device uses this lower level revocation list to verify the status of devices to which it communicates content material. Because each list is limited to devices at each level of a conventional hierarchy of consumer devices, the lists provide an optimization at each device, by providing revocations only for devices that are expected to be used at the particular hierarchy level.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

For ease of reference and understanding, the invention is presented hereinafter using a public-private asymmetric key paradigm. As will be evident to one of ordinary skill in the art in view of this disclosure, symmetric keys may also be used, including shared keys that are derived based on the communication of public parameters having corresponding private parameters at each of the corresponding communicating devices.

Figure 1:
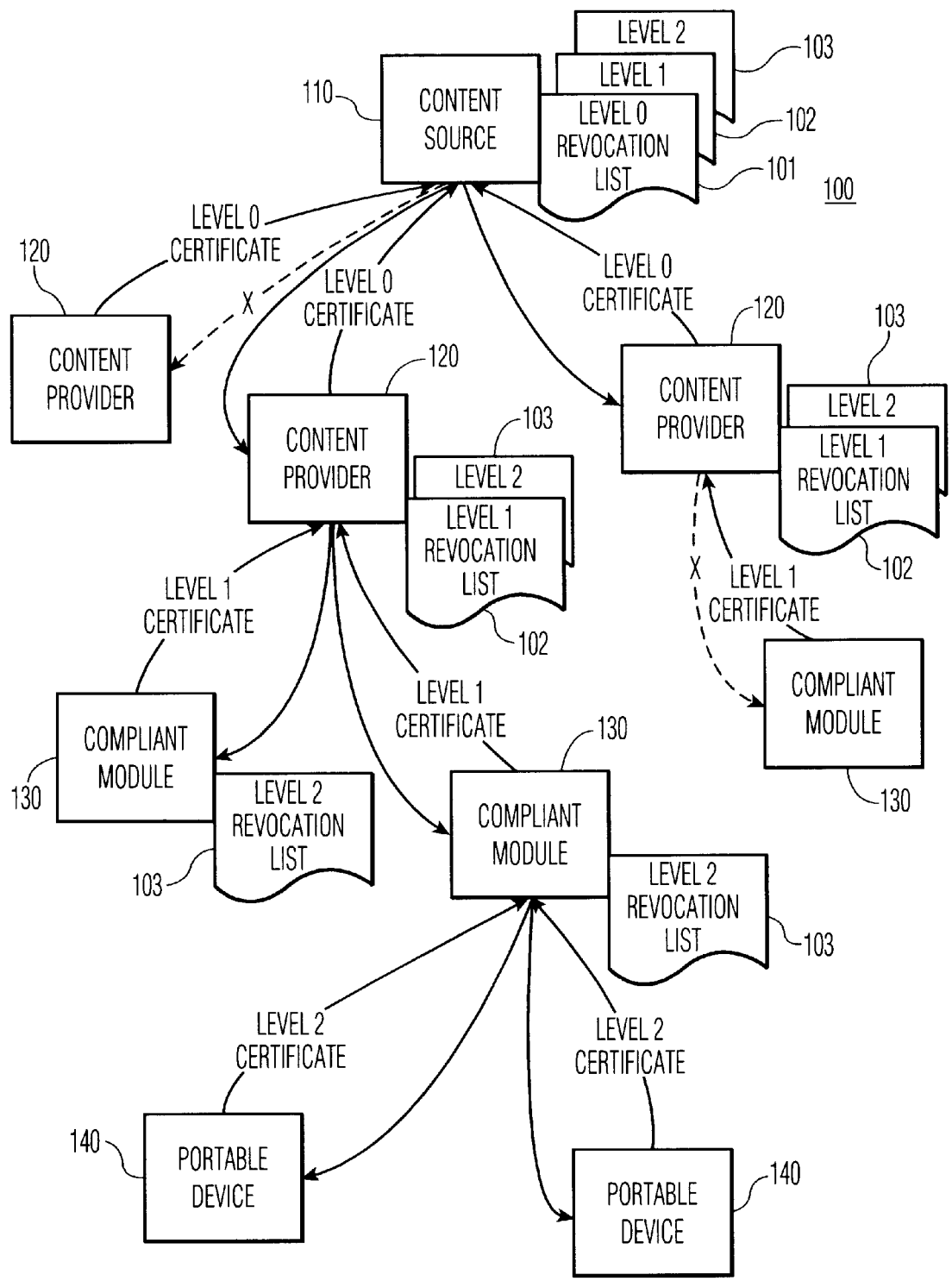
FIG. 1 illustrates an example flow diagram of a system that employs a hierarchical arrangement of revocation lists in accordance with this invention.

FIG. 1 illustrates an example system 100 that employs a hierarchical arrangement of revocation lists in accordance with this invention. The hierarchical arrangement corresponds to a hierarchy of devices that process, provide, or render content information. At an upper level of the device hierarchy is a content source 110 that provides content material. This content source 110 may be, for example, the studios that produce the content material. At the next level of the device hierarchy are content providers 120. The content providers 120 in this example may be cable or satellite television providers, commercial music providers on the Internet, and so on. At another intermediate level of the device hierarchy are compliant modules 130. A compliant module 130, for example, may be a set-top box that receives content material from a cable television provider, or a computer that receives content material from the Internet. At a terminal level of the device hierarchy, are portable devices 140, such as portable MPEG-3 players. Other arrangements of device hierarchies would be evident to one of ordinary skill in the art in view of this disclosure.

In accordance with this invention, a revocation list is maintained at each level of the device hierarchy. As illustrated in the example hierarchy of FIG. 1, the highest level device, the content source 110, includes the lists 101, 102, 103 for each device level. The revoked certificates of content providers 120 are contained in the level 0 revocation list 101. The revoked certificates of compliant modules 130 are contained in the level 1 revocation list 102. The revoked certificates of portable devices 140 are contained in the level 2 revocation list 103. Each of these lists are substantially disjoint from each other, so that a search for a particular certificate is limited to the certificates at the device's level, rather than the certificates of all devices. The shorter lists also reduce the amount of storage required at each level. At the highest level of the hierarchy, where storage is less of a constraint, all of the lists 101–103 are stored; at the next lower level of the hierarchy, at the content providers 120, the uppermost revocation list 101 need not be stored. In like manner, at the module 130 level, only the lowest level 2 revocation list 103 need be maintained.

As illustrated in FIG. 1, the content providers 120 each submit a certificate to the content source 110 in order to certify their authorization to receive content material or other protected material. For ease of reference, these certificates are termed "level 0" certificates, corresponding to the aforementioned "level 0" revocation list 101. If the certificate is determined to be valid, and not included in the revocation list 101, the protected information is communicated to the content provider 120, as indicated by the solid arrow lines in FIG. 1. If the certificate is invalid or revoked, subsequent communication of protected material is terminated, as indicated by the dashed arrow lines in FIG. 1. In like manner, the compliant modules 130 communicate "level 1" certificates to the content providers 120, and the portable devices 140 communicate "level 2" certificates to the compliant modules 130. At each level of the hierarchy, the communicated certificates are compared to the entries in the corresponding revocation list at that level.

Figure 2:
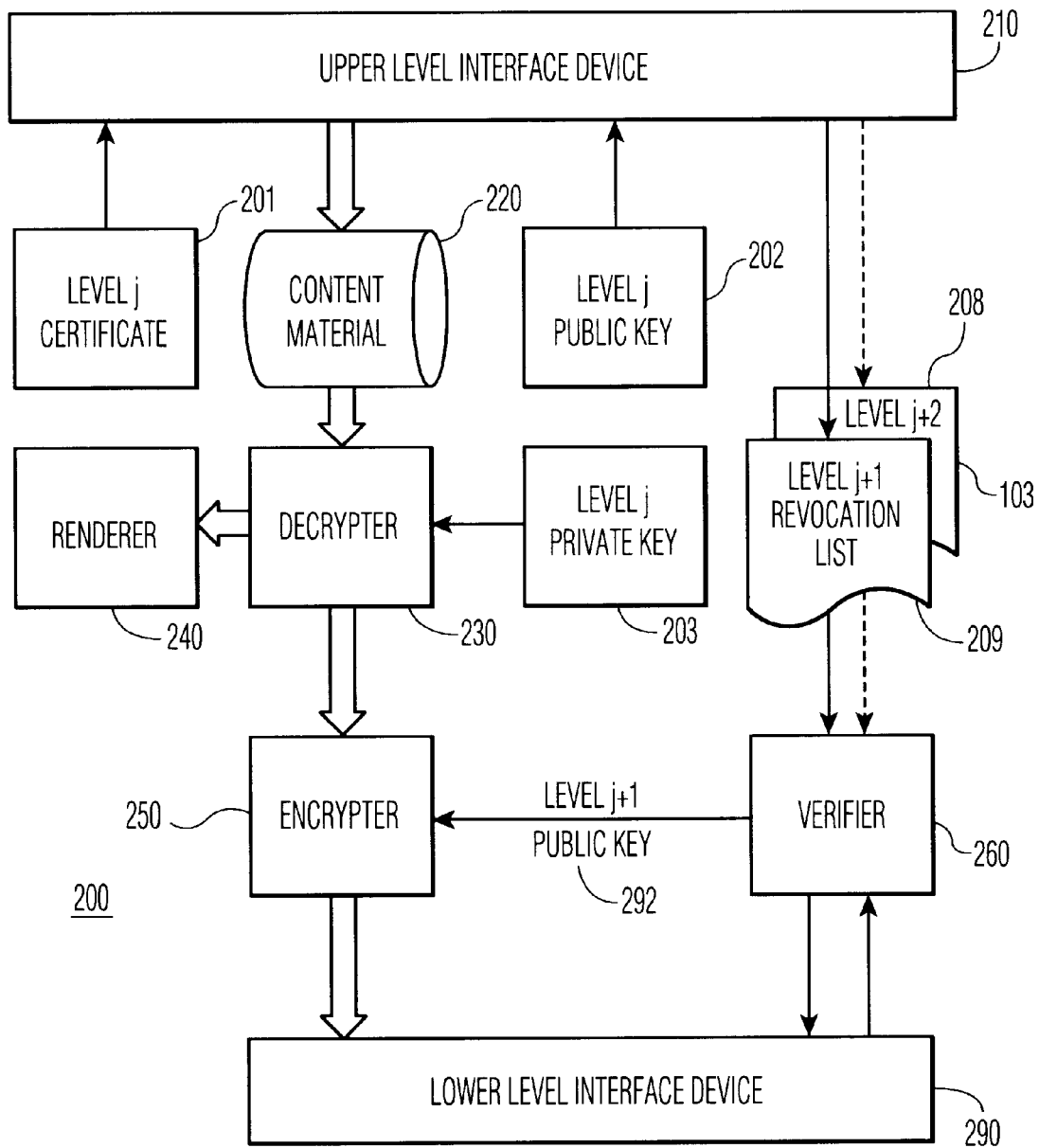
FIG. 2 illustrates an example block diagram of an asset control device in accordance with this invention.

FIG. 2 illustrates an example block diagram of an access control device 200, as may be used, for example, at the compliant module 130 or the content provider 120 levels of the device hierarchy of FIG. 1. Because the access control device 200 is used at any level of the hierarchy, the "level" indicator is indicated by the letter "j". That is, at the example content provider 120 level, "j" equals 0; at the compliant module level, "j" equals 1. If other levels are used, "j" is adjusted accordingly. The example access control device 200 includes an upper level interface device 210 for communicating with an upper level access device, such as a content provider 120 if the access control device 200 corresponds to a compliant module 130 of FIG. 1. The example access control device 200 also includes a lower level interface device 290 for communicating with a lower level access device, such as a portable device 140 if the access control device 200 corresponds to a compliant module 130 of FIG. 1.

The access control device 200 includes a level "j" certificate 201 that is communicated to the upper level access device, via the upper level interface device 210. The upper level access device is structured in a similar manner to the illustrated access control device 200, and includes a verifier similar to the verifier 260 of FIG. 2, the function of which is discussed below.

If the communicated level "j" certificate 201 is verified at the upper level access device, the upper level access device communicates a level "j+1" revocation list 209 that can be used to verify lower level "j+1" certificates. Upon receipt of a lower level "j+1" certificate, from the lower level access device via the lower level interface device 290, the verifier 260 checks the "j+1" certificate for authenticity using techniques common in the art, discussed above, and then determines whether the authenticated certificate is included in the "j+1" revocation list 209. If it is included in the revocation list 209, further communication with the lower level access device is terminated or otherwise controlled to prevent the communication of copy protected material to the lower level access device via the lower level interface device 290.

Also illustrated in FIG. 2, if the access control device 200 is two hierarchy levels up from the terminal level, such as a content provider 120 of FIG. 1, the access control device 200 also receives a level "j+2" revocation list 208 from the upper level access control device, such as the content source 110. If the verifier 260, discussed above, verifies the "j+1" certificate the "j+2" revocation list 208 is communicated to the lower level access device, via the lower level interface device 290. This "j+2" revocation list 208 becomes the "j+1" revocation list 209 at the corresponding access control device 200 at the next lower level of the hierarchy. Note that, depending upon the particular constraints imposed, the access control device 200 can be configured to store one or more of the revocation lists 208, 209 locally, or obtain the revocation list 208, 209 as required each time an access is requested from a lower level device. Preferably, each device 200 stores the applicable lists 208, 209 for immediate access by the device 200 each time a lower level device presents a certificate for verification.

The access control device 200 also contains a storage device 220 for storing content material that it receives from the higher level access device after its level j certificate is verified by the upper level access device. Preferably, this content material is encrypted at the upper level access device using a key that corresponds to a level j public key 202 that is communicated to the upper level access device via the upper level interface device 210. Typically, the public key 202 of the device 200 is associated with, or contained within, the certificate 201 that is communicated to the upper level access device to authenticate the content access device 200. A decrypter 230 decrypts the encrypted content material using a corresponding level j private key 203 before the content material is presented to an optional renderer 240, and before the content material is communicated to the lower level access device. Note that the decrypter 230 is illustrated as receiving the content material from the storage element 220, indicating that the content material is stored in the storage element 220 in encrypted form. Alternatively, the storage element 220 could be placed between the decrypter 230 and the encrypter 250, indicating that the content material is stored in the storage element 220 in decrypted form.

In a preferred embodiment, content material is communicated to a verified lower level access device in an encrypted form. An encrypter 250 encrypts the decrypted content material using a level "j+1" public key 292 that it receives from the lower level access device, often as part of the "j+1" certificate that was used to verify the lower level access device.

Not illustrated, the content access device 200 may also be configured to provide peer-to-peer communications and access control. In such an embodiment, the upper level access control device communicates the level "j" revocation list to the content access device 200, and the verifier 260 controls a peer-to-peer interface device based on a verification of a received level "j" certificate from a peer device. In like manner, certain access control devices 200 may be configured to provide direct access to devices at farther lower levels of the hierarchy, by facilitating a verification by the verifier 260, based on the "j+1" 209, "j+2" 208, etc. revocation lists. These and other alternative configurations will be evident to one of ordinary skill in the art, in view of this disclosure.

Note that the use of lists that are partitioned by hierarchy level allows for the use of other optimization techniques, and these optimizations techniques can vary by hierarchy level. For example, the above referenced tree technique of Paul C. Kocher for optimizing the size and access security to a revocation list can be used at each level of the hierarchy. The above referenced revocation service concept of Perlman et al may be particularly applicable at a content provider 120 level. Copending U.S. patent application "Updating a Revocation List to Foil an Adversary", U.S. Ser. No. 09/370,489, filed Aug. 9, 1999 for Michael Epstein, discloses maintaining a random selection of revoked device identifiers, and is incorporated by reference herein. This updating scheme is an effective security solution when the storage capacity of an access device is limited, and would be particularly applicable at the compliant module 130 level.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although a strict hierarchy is presented herein, a looser hierarchical structure may also be used. That is, there may be some devices that are associated with multiple hierarchies, and at some level, different hierarchy structures may be spawned. For example, the hierarchy may be partitioned at some point into an audio-device hierarchy, and a video-device hierarchy. A DVD player may be associated with both hierarchies, and may appear at two hierarchical levels of one or both of these hierarchies, such as a terminal level (player-level) and an intermediate level (player-and-distributor level). A walkman-like device, on the other hand, would typically not be associated with a video-device hierarchy, and would only appear at the terminal level. In like manner, although an explicit decryption and encryption process is indicated at each level of the hierarchy, alternative schemes are common in the art for effecting a level-dependent decryption and encryption without requiring an exhaustive encryption or decryption of the content material. For example, the content material may be encrypted at the content source 110 using a public key K, such that a corresponding private key k is required to decrypt the material. This private key k is encrypted by the content source using a public key K', such that a second private key k' is required to decrypt the key k. The encrypted key k is communicated to the content provider 120. Typically, the second private key k' is known to the content provider 120, thereby allowing the content provider 120 to decrypt the key k, which can then be used to decrypt the encrypted content material, if required. Typically, however, the content provider 120 merely communicates the encrypted content material that it receives from the content source 110 to the compliant module 130, without explicitly decrypting and re-encrypting the material. In lieu of decrypting and re-encrypting the encrypted content material, the content source 110 merely decrypts the encrypted key k, then re-encrypts the decrypted key k using a third public key K" such that a corresponding private key k" is required to decrypt the re-encrypted key k. In this example, the third key k" is known to the compliant module 130, so that the compliant module 130 can decrypt the key k, and thereby be able to decrypt the content material that was encrypted by the content source 110 using the corresponding key K. Note that this "nested-key" encryption is equivalent to a direct encryption of the content material using a given public key Kx, because given the corresponding private key kx, the content material can be decrypted by decrypting the key k, and then using this key k to decrypt the content material that was encrypted with a corresponding key K. These and other system configuration and optimization features will be evident to one of ordinary skill in the art in view of this disclosure, and are included within the scope of the following claims.

I claim:

1. A method of protecting content material comprising:
    providing a first certificate to a providing device at a first level of a device hierarchy,
    receiving a subordinate revocation list corresponding to a subset of receiving devices at a subordinate level of the device hierarchy from the providing device, in dependence upon whether the first certificate is included in a first revocation list at the providing device corresponding to the first level of the device hierarchy,
    validating a second certificate of a receiving device at the subordinate level of the device hierarchy including:
        determining an authenticity of the second certificate, and
        determining whether the second certificate of the receiving device has been revoked, in dependence upon whether the second certificate is included in the subordinate revocation list, and
    communicating the content material to the receiving device in dependence upon the validation of the second certificate.

2. The method of claim 1, wherein
determining the authenticity of the second certificate includes:
    receiving the second certificate from the receiving device,
    applying a public key of a trusted authority to the second certificate to produce a verification parameter.

3. The method of claim 2, further including
encrypting the content material for communicating to the receiving device, via an encryption key that is based on the verification parameter.

4. The method of claim 1, further including
receiving a third revocation list from the providing device, corresponding to devices at a third level of the device hierarchy, and
communicating the third revocation list to the receiving device in dependence upon the validation of the second certificate.

5. The method of claim 1, further including
receiving a plurality of revocation lists from the providing device, and
communicating at least one of the plurality of revocation lists to the receiving device in dependence upon the validation of the second certificate.

6. An access control device for protecting content material comprising:
    an upper level interface device that is configured to provide communications with an upper level access device at an upper level of a device hierarchy,
    a lower level interface device that is configured to provide communications with a lower level access device at a lower level of the device hierarchy, and
    a verifier, operably coupled to the upper level interface device and the lower level interface device, that is configured to gate the communications with the lower level access device in dependence upon a lower level revocation list that is received from the upper level access device,
    wherein
        the upper level interface device is further configured
            to communicate a first certificate to the upper level access device, and
            to receive the lower level revocation list, in dependence upon a verification of the first certificate based on an upper level revocation list at the upper level access device,
            the lower level revocation list being substantially disjoint from the upper level revocation list, and
        the lower level interface device is further configured
            to receive a lower level certificate from the lower level access device, and the verifier is configured to
            prevent subsequent communications to the lower level access device, in dependence upon whether the second certificate corresponds to an entry in the lower level revocation list.

7. The access control device of claim 6, wherein
the verifier is further configured to determine the authenticity of the second certificate based on a public key of a trusted authority.

8. The access control device of claim 6, wherein
the communications to the lower level access device include the content material.

9. The access control device of claim 8, further including an encrypter that is configured to encrypt the content material for communication to the lower level access device, based on a public key that is associated with the lower level access device.

10. The access control device of claim 9, wherein the encrypter is configured to encrypt the content material by encrypting a decryption key that facilitates a decryption of the content material.

11. The access control device of claim 6, wherein the upper level interface device is further configured to receive a third revocation list associated with a third level of the device hierarchy, and the verifier is further configured to allow communication of the third revocation list to the lower level access device, via the lower level interface device, in dependence upon whether the second certificate corresponds to an entry in the lower level revocation list.

12. The access control device of claim 6, further including:

a storage device that is configured to store the content material for subsequent transmission to the lower level access device.

13. The access control device of claim 6, wherein the content material is stored in an encrypted form, and the access control device further includes a decrypter that is configured to decrypt the content material based on a private key that is associated with the access control device.

14. The access control device of claim 13, wherein the decrypter is configured to decrypt the content material by decrypting, via the private key, a decryption key that facilitates a subsequent decryption of the content material.

15. The access control device of claim 6, further including a rendering device that is configured to render the content material.

* * * * *